United States Patent [19]

Alexander

[11] 4,273,377
[45] Jun. 16, 1981

[54] TONNEAU COVER APPARATUS FOR PICKUP TRUCK VEHICLES

[76] Inventor: Ronald R. Alexander, 5301 W. Saguaro, Glendale, Ariz. 85304

[21] Appl. No.: 28,218

[22] Filed: Apr. 9, 1979

[51] Int. Cl.³ .............................................. B60P 7/02
[52] U.S. Cl. .................................... 296/100; 296/219
[58] Field of Search .................... 296/100, 101, 137 B, 296/137 C, 219; 308/3.6, 3.8, 6 R; 224/321; 52/573

[56] References Cited

U.S. PATENT DOCUMENTS

| 1,950,371 | 3/1934 | Baier | 296/137 C |
| 2,250,895 | 7/1941 | Premo | 308/3.8 |
| 3,400,973 | 9/1968 | Herou | 296/100 |
| 3,640,557 | 2/1972 | Nute, Jr. et al. | 52/573 |
| 3,851,428 | 12/1974 | Shuort | 52/573 |
| 3,901,548 | 8/1975 | Seamon, Jr. | 296/100 |
| 3,942,830 | 3/1976 | Woodard | 296/100 |

FOREIGN PATENT DOCUMENTS 213990 3/1958 Australia ................................. 296/100

Primary Examiner—John J. Love
Assistant Examiner—Ross Weaver
Attorney, Agent, or Firm—H. Gordon Shields

[57] ABSTRACT

Tonneau cover apparatus for pickup trucks includes an elongated track secured to the sides of a pickup, with ribs or cross members extending across the bed of the pickup and secured to bearing guides movable on the track. An impervious tonneau cover is secured to the ribs and is movable therewith to cover the bed of the pickup.

14 Claims, 18 Drawing Figures

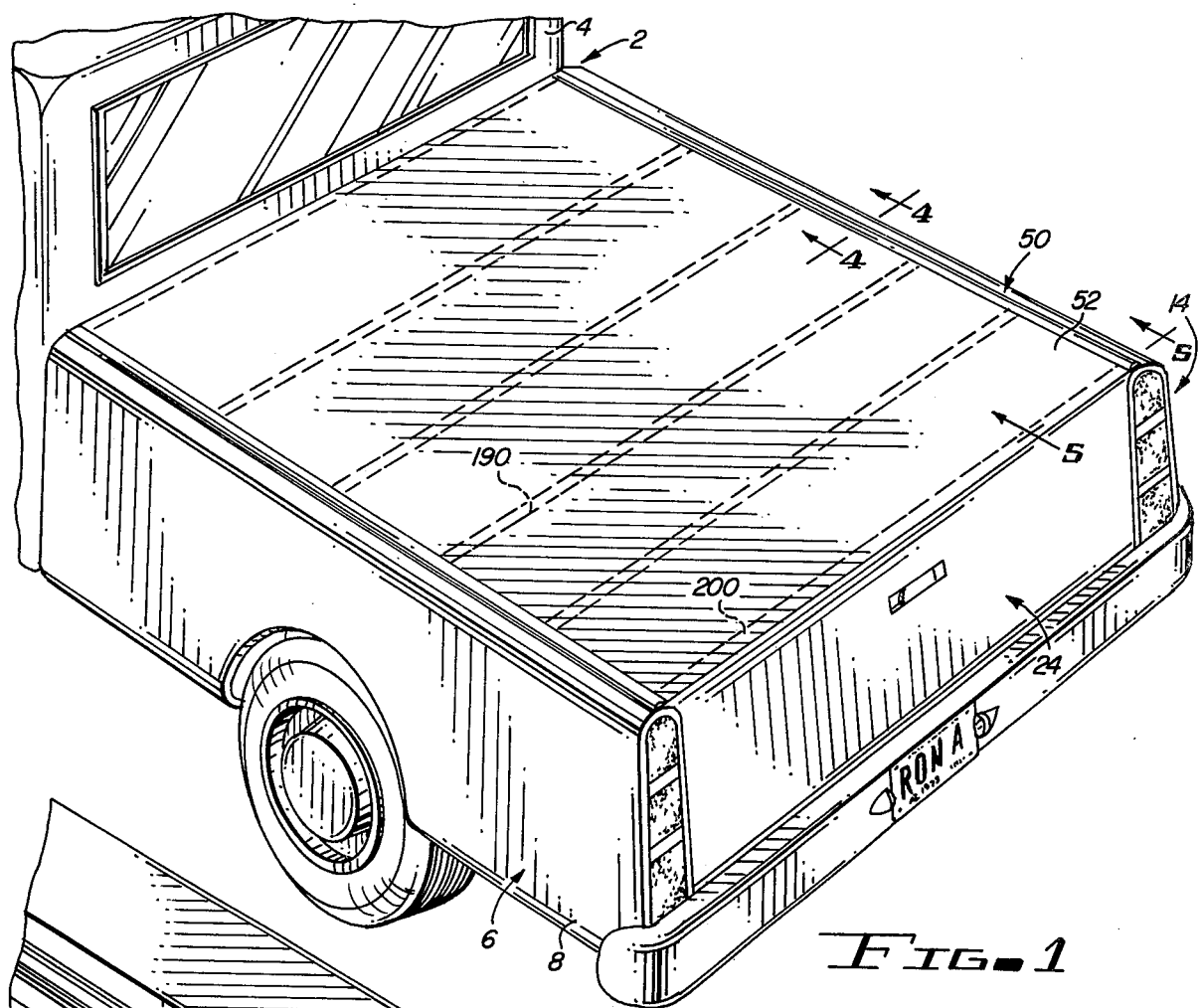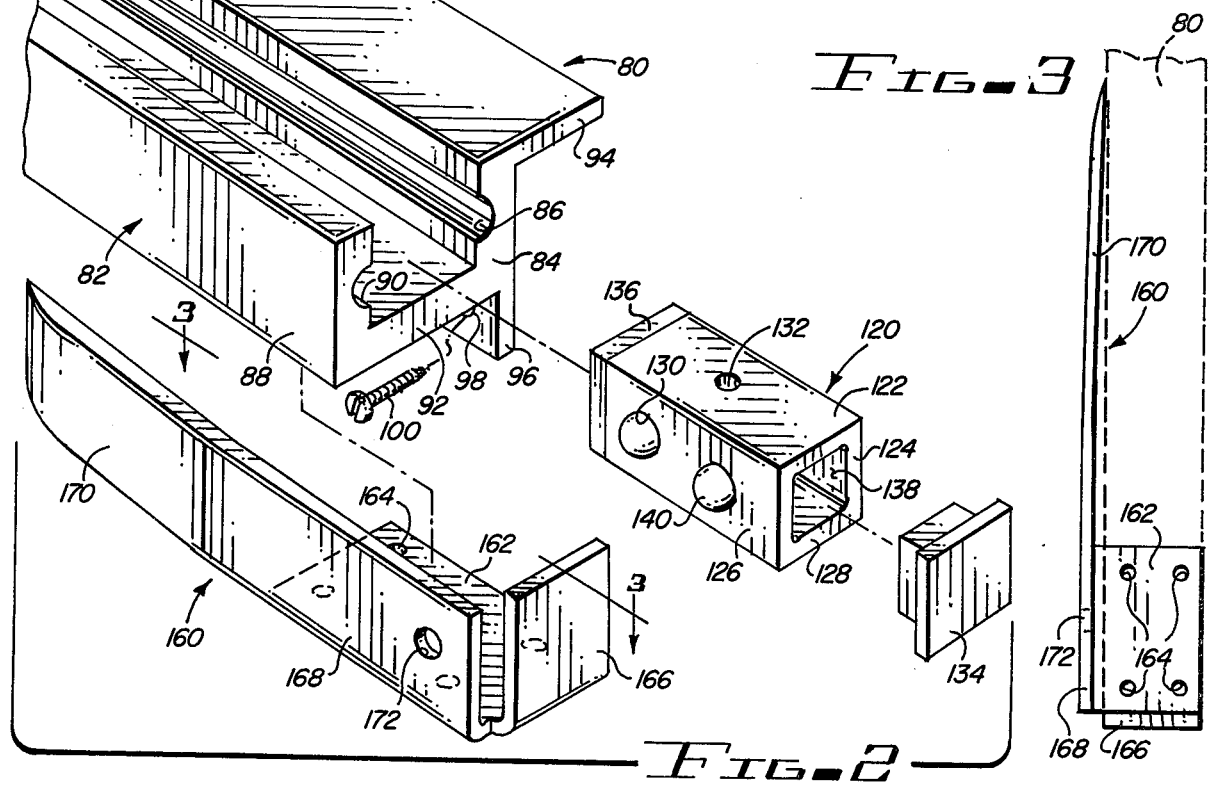

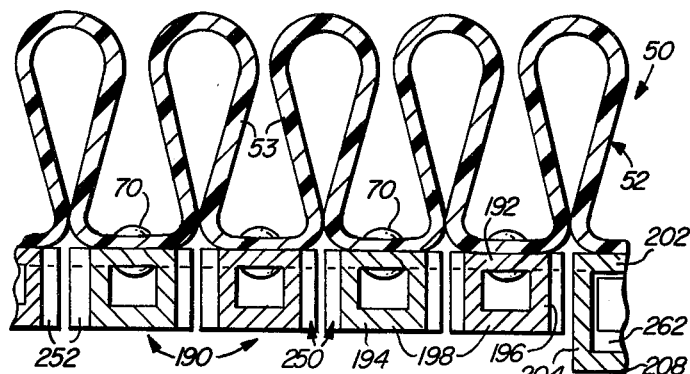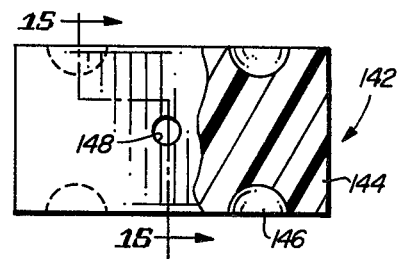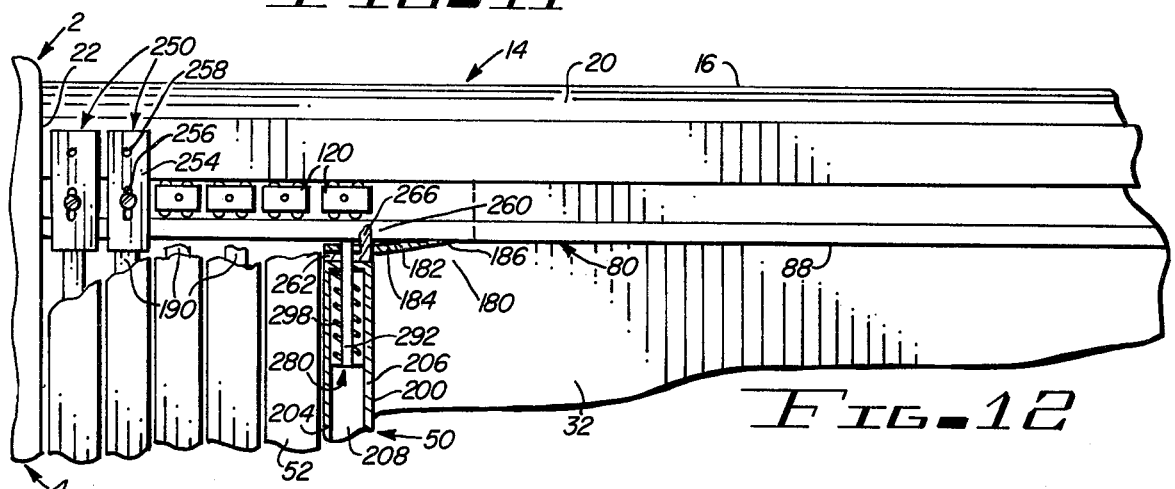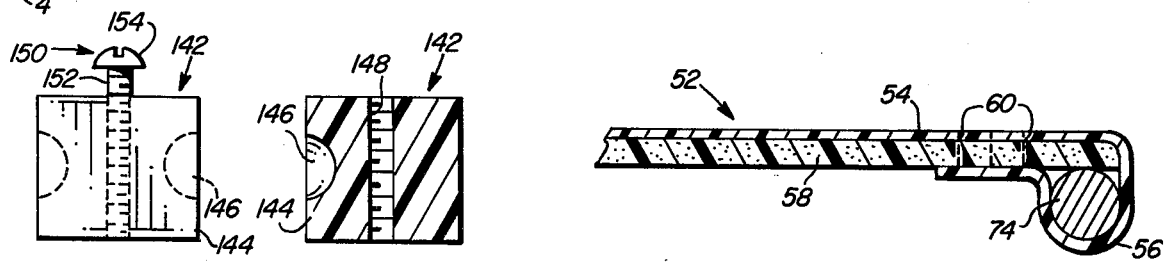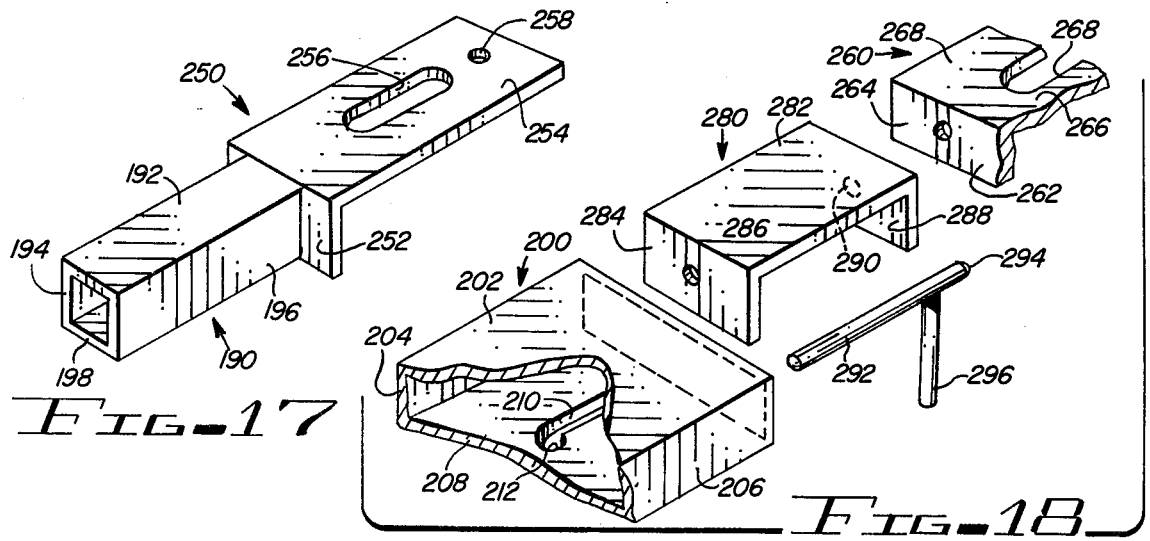

TONNEAU COVER APPARATUS FOR PICKUP TRUCK VEHICLES

BACKGROUND OF THE INVENTION

1. Field of the Invention

This invention relates to tonneau covers, and more particularly, to tonneau covers for covering the beds of pickup trucks.

2. Description of the Prior Art

Prior art patents are concerned more with shell type covers for trucks, including pickup trucks, than for tonneau covers which extends only across the sides of the pickup truck beds and which have no vertical wall structure above the sides of the truck. Examples of such shell types campers are shown in U.S. Pat. Nos. 3,201,171, 3,606,448, 3,688,787, and 3,901,548.

The '171 patent discloses a frame securable to the upper or top portion of a pickup bed side wall, and movable on the side wall, to allow the frame with a cover secured thereto, to collapse like an accordian. The cover, with the frame, comprises a generally inverted "U" shaped shell which defines a compartment between the bed of the pickup and the top or upper portion of the cover. Tension controls are included in the vertical members of the frame to provide a vertical tension on the frame to keep the cover taut when the apparatus is in the extended position.

The '448 patent discloses a cover which, in general configuration, is similar to that of the '171 patent. It comprises a generally "U" shaped inverted frame, with the cover secured thereto, which moves on a track disposed or secured to the top of the sides of a pickup truck bed. Another type of cover which collapses in an accordian-like fashion is shown in the '787 patent. Again, a generally inverted "U" shaped frame is secured to the top of the side walls of a pickup truck, with a covering disposed over the frame. The frame collapses in an accordian-like fashion.

Another slidable cover for a pickup truck, which includes the same general configuration of an inverted "U" shaped frame, but with the arms (or legs) of the frame extending outwardly rather than directly vertically, is shown in the '548 patent. The frame moves on a channel secured to the pickup bed walls.

Another type of cover for a truck is shown in U.S. Pat. No. 3,342,523. The cover comprises a sectional cover which includes supports secured to truck walls.

U.S. Pat. No. 3,363,938 also discloses a collapsible truck cover which moves longitudinally with respect to the bed of a truck and which includes arched vertical supports to which the cover is secured.

U.S. Pat. No. 3,986,749 discloses a collapsible cover which does not require or does not utilize a vertical frame, but rather includes a track secured to the top of side walls of a truck, and a cover which extends between the brackets secured to the walls of the truck. The cover moves horizontally over the truck of the bed, and, when in the closed position, nests in a vertical position adjacent the forward end of the truck bed.

SUMMARY OF THE INVENTION

The apparatus disclosed and claimed herein comprises a collapsible or foldable cover secured to the sides or side walls of a pickup truck, with supporting cross members movable in a track secured to the sides of the bed.

Among the objects of the present invention are the following:

To provide new and useful tonneau cover apparatus for a pickup truck;

To provide new and useful apparatus for covering the bed of a pickup truck with the cover extending between the vertical sides of the pickup truck;

To provide new and useful apparatus movable on a track for covering the bed of a pickup;

To provide new and useful apparatus for moving a bracket and a cover secured thereto in a pair of parallel tracks secured to the sides of a pickup truck; and To provide new and useful apparatus for securing a cover in place on the back of a pickup truck.

BRIEF DESCRIPTION OF THE DRAWING

FIG. 1 is a perspective view of a portion of a pickup truck showing the apparatus of the present invention in a closed position.

FIG. 2 is an exploded perspective view of a portion of the apparatus of the present invention.

FIG. 3 is a top view of a portion of the apparatus of FIG. 2.

FIG. 11 is a side or elevational view in partial section of a portion of the apparatus of the present invention, showing the apparatus of the present invention in open, folded position.

FIG. 12 is a top view of the apparatus of the present invention, with a portion broken away, illustrating the apparatus of the present invention in the open, folded position. FIG. 13 is a top view, in partial section, illustrating an alternate embodiment of a bearing guide usable in the apparatus of the present invention.

FIG. 14 is an end view of the apparatus of FIG. 13.

FIG. 15 is a view in partial section of the apparatus of FIG. 13, taken generally along line 15—15 of FIG. 13.

FIG. 16 is a view in partial section of a portion of the apparatus of the present invention.

FIG. 17 is a perspective view of a portion of the apparatus of the present invention.

FIG. 18 is an exploded, perspective view of a portion of the apparatus of the present invention.

DESCRIPTION OF THE PREFERRED EMBODIMENT

Figure 9:
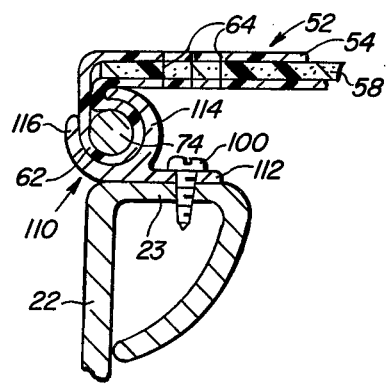
FIG. 9 is a view in partial section of a back portion of the apparatus of the present invention.

FIG. 1 comprises a perspective view of a pickup truck 2. The truck 2 includes a cab 4, a left side wall 6, a right side wall 14, and a tailgate 24. Tonneau cover apparatus 50, which includes a tonneau cover 52, is shown secured to the pickup truck, and extending between the cab 4 and the tailgate 24, and between the left side wall 6 and the right side wall 14. It will be noted that the tonneau cover 52 extends substantially the full length of the pickup bed, which is the area from rearwardly of the cab 4 to the tailgate 24, and between the side walls. Moreover, it will be noted that the tonneau cover 52 is substantially flush or flat with the tops of the respective side walls and tailgate. The cover 52 is actually secured to a front wall 22, as shown in FIGS. 9 which wall 22 is disposed adjacent the cab 4 and, as is understood, also secured to the side walls 6 and 14.

As is well known in the construction of pickup trucks, the actual bed of the truck is surrounded by vertically extending walls, all of which are substantially the same height. With respect to the pickup truck 2 illustrated in FIG. 1, and portions of which are shown in other Figures herein, it is assumed that the walls, including the front wall 22, and the left and right side walls 6 and 14, respectively, and the tailgate 24, are about the same height.

As is also well known in the art, the walls, including the side walls and the tailgate, of pickup trucks are generally comprised of two spaced apart panels, which are commonly referred to as double walls. The two panels, which are generally vertically extending, are spaced apart by a top wall portion which, on contemporary pickup trucks, is generally flat or horizontally extending.

Figure 10:
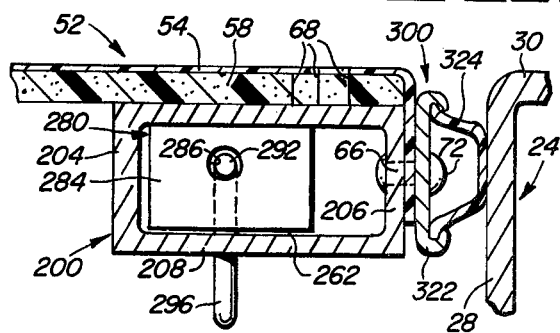
FIG. 10 is a view in partial section of a front portion of the apparatus of the present invention.

The tonneau cover apparatus 50 includes the cover 52, which is generally a relatively long panel of appropriate fabric or material, such as vinyl. The cover 52 extends between the cab 4 (or actually the front wall 22) and the tailgate 24, and between the side walls 6 and 14. Details of securing the tonneau cover 52 to the front wall 22 is best shown in FIG. 9, and of securing the cover 52 to the side walls is illustrated best in FIGS. 4 and 5. FIG. 10 shows the cover 52 at the closed tailgate 24.

Figure 4:
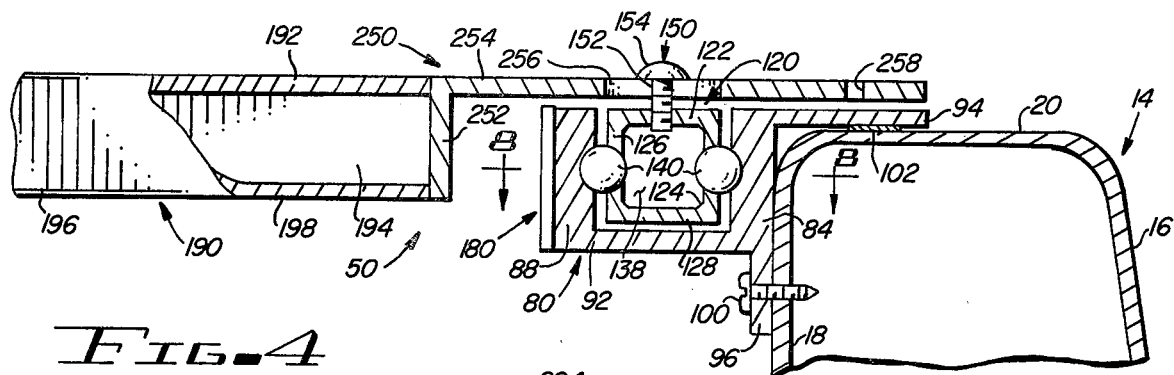
FIG. 4 is a view in partial section of a portion of the apparatus of FIG. 1, taken generally along line 4—4 of FIG. 1.
Figure 5:
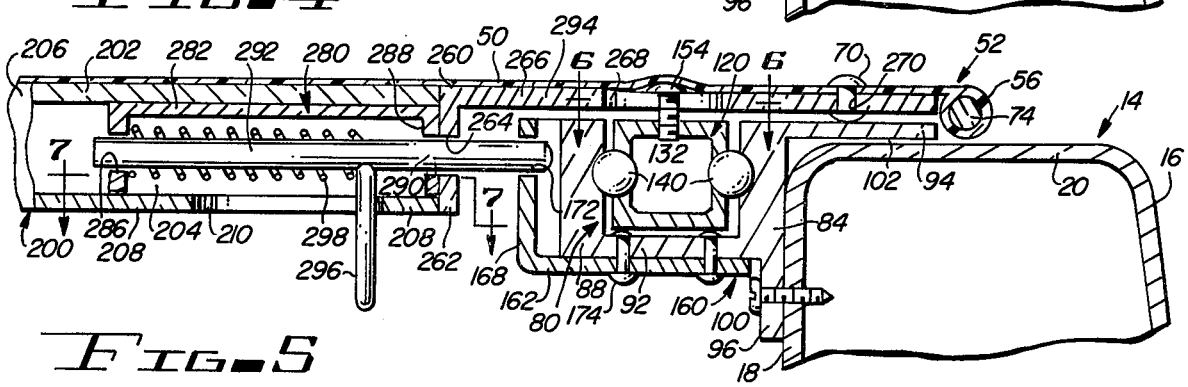
FIG. 5 is a view in partial section of a portion of the apparatus of FIG. 1 taken generally along line 5—5 of FIG. 1.
Figure 8:
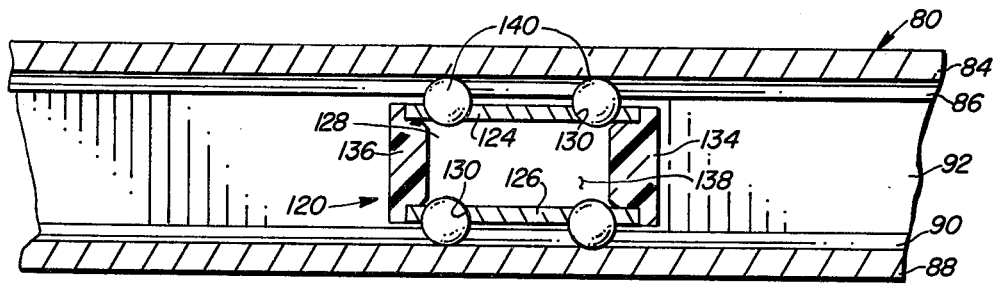
FIG. 8 is a view in partial section of a portion of the apparatus of FIG. 4, taken generally along line 8—8 of FIG. 4.

FIG. 4 is a view in partial section of the apparatus of FIG. 1 taken generally along line 4—4 of FIG. 1. FIG. 5 is a view in partial section of the apparatus of FIG. 1 taken generally along line 5—5 of FIG. 1. FIGS. 4 and 5 illustrate the securing of tonneau cover apparatus 50 to the side walls of the pickup truck 2. The tonneau cover 52 moves longitudinally with respect to the pickup truck 2 on a pair of tracks 80 secured to the side walls of the pickup bed. FIG. 2 comprises a perspective view of a track 80, with cooperating portions separated or exploded from the track 80 to show the relationships among the various elements. FIG. 8 is a view in partial section of the track 80, taken generally along line 8—8 of FIG. 4. For the following discussion of the tonneau cover apparatus 50, particularly as it relates to the track 80, reference will be made primarily to FIGS. 1, 2, 4, 5, and 8. Descriptions of other Figures, as they relate to various elements, will be given below as they are discussed.

The right side wall 14 of the pickup truck 2, as best shown in FIGS. 4 and 5, comprises a right side outer wall 16 spaced apart from a right side inner wall 18, and joined by a right side top wall 20. The track 80 is secured to the inner wall 18, and a portion of the track extends over the top wall 20.

The track 80 includes three portions, the first of which is a primary or groove portion 82 which comprises three segments. The first segment is a vertical segment or wall portion 84, which includes an axially extending groove 86. The second segment is a second vertical wall portion 88, which also includes an axially extending groove 90, and the third segment is a bottom portion 92. The vertical wall portions 84 and 88 are substantially parallel to each other and spaced apart to allow for the movement therebetween of a bearing guide 120. The grooves 86 and 90 are also substantially parallel to each other. They receive bearings 140 which extend outwardly from the bearing guide 120. The bottom portion 92 connects the vertical wall portions.

The second and third portions of the track 80 comprise a horizontally extending flange 94 which extends outwardly from the vertical portion or wall 84, and a vertical flange 96, which extends downwardly from the vertical wall 84. The horizontal flange 94, as shown in both FIGS. 4 and 5, extends over the top wall 20 of the right side wall 14. A gasket 102 is shown in FIGS. 4 and 5 as being disposed on the bottom surface of the horizontal flange 94 and thus contacts the upper surface of the top wall 20. The gasket 102 accordingly comprises a seal between the horizontal flange 94 of the track 80 and the truck side wall 14.

The vertically downwardly extending flange 96 includes a plurality of spaced apart apertures or holes 98. The holes 98 receive screws, such as the screw 100, to secure the track 80 to the inner side wall 18, as best shown in FIGS. 4 and 5. The screw 100 is shown spaced apart from the hole 98 in FIG. 2. While the track 80 is illustrated in FIGS. 2, 3, and 4 in conjunction with the right side wall 14, it is obvious that by simply reversing the track 80 it may also be disposed against, and secured to, the left side wall 6 of the pickup truck.

The bearing guide 120 is shown in FIG. 2 spaced apart from the track 80. It comprises a generally rectangular tubular portion having a top wall 122, a pair of spaced apart side walls 124 and 126, and a bottom wall 128. The cross section of the bearing guide is rectangular, with the top wall 122 substantially parallel to the bottom wall 128, and the side walls 124 and 126 substantially parallel to and spaced apart from eah other. The side walls 124 and 126 each includes a pair of aligned bearing apertures 130 which each receive a bearing 140.

The assembly of the bearing guide 120 within the track 80 is best shown in FIGS. 4 and 5. FIG. 8, which comprises a top view in partial section of the apparatus of FIG. 4, taken generally along line 8—8 of FIG. 4, also shows the bearing guide 120 disposed on the track 80, and with the bearings 140 extending from the bearing apertures 130 of the bearing guide 120 into the parallel grooves 86 and 90 of the vertical side walls 84 and 88, respectively, of the track 80.

The top 122 of the bearing guide 120 includes a tapped hole or aperture 132. As best shown in FIGS. 4 and 5, a portion of a threaded shank 152 of a screw 150 extends into the tapped aperture 132. The screw 150 also includes a head 154 which is disposed above the top wall 122 of the bearing guide 120. The purpose of the screw 150 will be discussed below, in conjunction with FIGS. 4, 5, and other Figures.

The bearing guide 120 also includes a pir of end plugs 134 and 136 which extend into the open ends of the bearing guide. The interior of the bearing guide 120 comprises an interior bore 138, which is defined by the top and bottom walls 122 and 128, respectively, and the side walls 124 and 126. The interior bore 138 is preferably filled with grease or other lubricant to provide appropriate lubrication for the ball bearings 140. As is best shown in FIGS. 4, 5, and 8, the bearings 140 communicate with the interior bore 138 through the bearing apertures 130 and may accordingly be lubricated by the grease or other lubricant disposed within the bore 138.

An alternate bearing block 142 is shown in FIGS. 13, 14, and 15. FIG. 13 is a top view, with a portion broken away, of the alternate bearing block 142, and FIG. 14 is an end view of the bearing block 142 of FIG. 13. FIG. 15 is a view in partial section of the bearing block 142 taken generally along line 15—15 of FIG. 13.

The bearing block 142 comprises a generally rectangular, solid block 144, which is nearly square in cross section, as shown in FIGS. 14 and 15. The block 144 includes a pair of bearing recesses 146 extending inwardly with respect to the block from each of the opposite and parallel sides. A tapped aperture 148 extends through the block from the top to the bottom, as best illustrated in FIG. 15. The screw 150, of FIGS. 4 and 5, is shown threadedly engaging the tapped aperture or hole 148 of the block 142 in FIG. 14.

The block 144 is preferably made of a plastic and self-lubricating material, such as nylon, to minimize frictional resistance between the block 104 and the bearings 140 which extend into the bearing recesses 146.

To retain the bearing guide 120, or the alternate bearing guide 142, whichever is used, in the track 80, an end bracket 160 is secured to the track 80. The end bracket 160, shown best in FIG. 2, comprises an outer or tailgate end bracket 160. A forward end bracket 180 is shown in FIG. 12. The end bracket 160 comprises a single piece, bent into three portions. The three portions include a bottom portion 162, which includes four holes 164 which receive appropriate fasteners, such as screws, to secure the bracket 160 to the track 80.

A second portion, secured to the bottom portion 162, and extending substantially perpendicular thereto, is an end wall 166. The end wall 166 extends upwardly from the bottom portion 162 to cover the end of the track 80 to retain the bearing guides, such as bearing guide 120, in the track.

The third portion of the end bracket 160 comprises a side wall 168. The side wall includes an angle portion 170, remote from the bottom portion 162 and the end portion 166. The side wall 168 extends vertically, substantially perpendicular to both the bottom portion 162 and the end wall 166. The side wall 168 includes a locking hole 172 extending through the wall to receive a locking pin or bolt, as discussed below.

FIG. 3 comprises a top view of the end bracket 160, showing the relationship between the three portions of the end bracket 160, including the bottom portion 162, the end portion 166, and the side portion 168. The four holes 164 are shown extending through the bottom 162. The holes 164 are spaced apart in a regular geometric configuration.

In FIG. 2, the end bracket 160 is shown spaced apart from the track 80. In FIG. 3, the end bracket 160 is shown with a portion of the track 80 in phantom, illustrating the orientation of the end bracket 160 relative to the track 80. The orientation of the angled portion 170 of the side wall 168 is best illustrated in FIG. 3. It will be noted that the side wall 168 is spaced apart slightly from the vertical side wall 88 of the track 80. However, the bent portion 170 extends inwardly to close the spacing between the vertical side wall 88 of the track until the bent portion 170 is substantially adjacent or in contact with the side wall. Thus, the side wall portion 170 defines a cam surface which allows the locking bolt, as mentioned above and as discussed below, to ride on the side wall of the end bracket until it reaches the hole or aperture 172 and is biased therein by a compression spring, also discussed in detail below, primarily in conjunction with FIG. 5.

FIG. 12 comprises a top view of a portion of the tonneau cover apparatus 50 secured to the pickup truck 2. A portion of the tonneau cover apparatus is broken away to show various details of the apparatus. Included in FIG. 12 is a view in partial section of a forward bracket 180 shown secured to the track 80 adjacent the front wall 22 of the pickup 2. It will be noted that the track 80 extends along the right side wall 14 to the front end wall 22, adjacent the cab 4 of the pickup 2. Accordingly, the front wall 22 acts as a stop to prevent the bearing guides from rolling out of the track 80 forwardly. However, the front or forward end bracket 180, while it does not serve the function of retaining the bearing guides within the track 80, still retains the function of locking the tonneau cover 50 in place at the forward end of the bed 32, as shown best in FIG. 12. As is obvious, the bracket 180 does not include an end portion, comparable to end portion 166 of bracket 160.

The forward end bracket 180 includes a bottom portion 182 and a side wall 184. The bottom portion 182 is substantially the same as the bottom portion 162 of the outer or tailgage end bracket 160, in that it includes four holes throuh which appropriate fasteners, such as screws, extend to secure the end bracket 180 to the bottom of the track 80. The end bracket 180 also includes a side wall 184 which includes an angled portion 186. The side wall 184 is secured to the bottom wall 182, and extends vertically upwardly therefrom and substantially perpendicular thereto. As may be seen from FIG. 12, the side wall 184 is spaced apart from the outer wall 88 of the track 80 and it includes a hole or aperture into which a locking bolt extends. The angled portion 186 of the end bracket 180 extends from the side wall 184 inwardly toward the wall 88 of the track 80 and comprises or defines a cam surface against which the locking bolt may ride until it reaches the hole in the side wall 184, into which it then extends to lock the cover 52 to the track 80.

The right side wall 14 if the pickup 2 has been discussed in conjunction with a single track 80 and the end brackets 160 and 180. It will be understood that the left side wall 6 of the pickup 2 (see FIG. 1) also includes a track 80, with a plurality of bearing guides, as discussed above, and with appropriate end brackets, such as the end brackets 160 and 180. The end brackets for the left side wall will comprise mirror images of the brackets 160 and 180, as shown and discussed herein. Moreover, the locking bolt, and locking elements, as discussed below, are found on both sides of the pickup to lock the tonneau cover 52 to both sides of the apparatus 50 and the truck 2.

Turning again to FIG. 1, it will be noted that a plurality of cross members 190 are shown in phantom extending laterally with respect to the pickup 2 and to the tonneau cover apparatus 50, beneath the cover 52. For long bedded pickups, five cross members 190 are preferred, and for short bed pickups, only four cross members 190 are needed. A single master or outer end cross member 290 is shown in phantom in FIG. 1.

FIG. 4 illustrates a cross member 190, showing the cross member secured to a slave bracket 250. The slave bracket 250 is in turn secured to a bearing guide 120. FIG. 5 shows, in partial section, the master cross member 200 secured to a master bracket 260, which is in turn secured to a bearing guide 120.

FIG. 11 is a view in partial section showing the tonneau cover apparatus 50 and its folded, or rearward position, and showing the cover 52 secured to a plurality of the cross members 190 through the slave brackets 250. It will be noted that the track 80 and bearing guides 120 (or 143) are not shown in FIG. 11. They have been omitted for clarity. See FIGS. 4, 5, and 12 for all the various elements and their relationships to each other. FIG. 12, which has been briefly mentioned above, shows from the top the tonneau cover apparatus 50 in its folded position, similar to FIG. 11, but with a portion of the cover removed to show the relationship between the cross members 190, the slave brackets 250, and the bearing guides 120. The relationship of the various elements and the track 80 is also illustrated in FIG. 12. Moreover, the master cross member 200 is also shown, with its locking apparatus and the inner or forward end bracket 180 secured together and to the track 80. Most of the various elements which comprise the tonneau cover apparatus 50 are accordingly illustrated in FIG. 12.

For the following discussion pertaining to the cross members 190 and the slave brackets 250, reference will be made primarily to FIGS. 4, 5, 11, and 12, as described above.

The cross members 190 are preferably square steel tubing. They include four adjacent panels or walls, including a top panel or wall 190, a pair of side panels or walls 194 and 196, and a bottom panel or wall 198. The interior of the cross members 190 is, of course, hollow.

The slave brackets 250 comprise a pair of plates, including a vertical end plate 252 and a horizontal top plate 254. The vertical and horizontal plates are disposed substantially perpendicularly to each other. The end plates 252 are secured to the ends of the cross members 200, preferably by welding, as may be seen in FIG. 4. The overall height of the brackets 250 is substantially the same as the height of the cross members 190, and accordingly the top panel 192 of the cross member 190 is aligned with the horizontally extending plate 254 of the bracket 250.

As may be seen from FIGS. 11 and 12, the width of the brackets 250 is greater than the width of the cross members 190, and the cross members 190 are secured substantially centrally with respect to the vertical end plates 252.

The horizontally extending top plate 254 of each slave bracket 250 includes a slot 256 which extends longitudinally with respect to the plate 254. At the outer or distal end of each top plate, remote from the end plate 252, is a centrally located rivet hole 258. As best shown in FIG. 4, the slot 256 is disposed over the top 122 of the bearing guide 120, with the shank 152 of the screw 150 extending through the slot and secured to the bearing guide 120. The width of the slot 256 is slightly greater than the diameter of the shank 152 of the screw 150, so that the cross member 190 and the slave bracket 250 moves freely relative to the screw 150 and the bearing guide 120. However, the width of the slot 256 is substantially less than the diameter of the head 154 of the screw 150, so that when the shank 152 of the screw is extended through the slot 256 and secured to the bearing guide 120, the head 154 of the screw 150 will prevent the disengagement of the bracket 250, as secured to the cross member 190, from the bearing guide 120 and the screw 150. The length of the slot 256 accordingly allows relative motion between the cross member 190 and its bracket 250 and the bearing guide 120. This, in turn, allows for the shifting of the cross member as the cross member is moved axially with respect to the track 80, and also allows for compensating movement of the cross member 190 relative to the track 80 which may result from the parking of the pickup 2 on a slope, on a shoulder of a road, or even vertical and/or lateral movement of the sides 6 and 14 of the pickup truck relative to each other, which may result from an accident, or the like.

The rivet hole 258 is used to secure the tonneau cover 50 to the bracket 250, as will be explained in detail below. However, it will be noted that only a single rivet is used for each slave bracket.

The master or outer cross member 200, shown perhaps best in FIG. 5, comprises a rectangular steel tube which includes a top panel or wall 202, a pair of side panels or walls 204 and 206, and a bottom panel or wall 208. The width of the cross member 200 is substantially larger than the width of the cross members 190. Only a single master or outer cross member is required for each tonneau cover apparatus 50.

A master bracket 260 is secured to the outer end of the cross member 200, as best shown in FIG. 5. The bracket 260 is, like the brackets 250, comprised of a vertically extending plate or portion 262 and a horizontally extending plate or portion 266. The vertical portion 266 comprises a top plate. The vertical end plate 262 is secured, as by welding, to the end of the cross member 200. The top plate 266 is aligned with the top plate 202 of the cross member 200, as shown in FIG. 5.

Because the cross member 200 and the bracket 260 accommodate a locking bolt 292, the end plate 262 includes a hole or aperture 264 which extends through the end plate to allow the bolt to extend through the end plate 262 and into the hole or aperture 172 of the end bracket 160, which hole is best shown in FIGS. 2, 3, and 5.

The horizontally extending top plate 266 includes a slot 268, which is substantially identical to the slots 256 in the brackets 250. The slot 268 also serves the same purpose, which is to receive a shank 152 of a screw 150 to allow relative movement between the cross member 200 and the bearing guide 120. Similarly, the top plate 266 also includes, outboard of the slot 268, a rivet hole 270 for securing the cover 52 to the bracket 260 and cross member 200 by a rivet 70.

In FIG. 5, there is shown a tonneau cover 52 disposed over the cross member 200, the master end bracket 260, and extending beyond the top plate 266 and over the top panel 20 of the right side wall 14 of the pickup 2. It will be noted that the cover 52 is merely supported by the cross member 200, and is not secured thereto. Moreover, the cover 52 is disposed over the head 154 of the screw 152. The cover 52 is secured to the outer or distal end of the top plate 266 of the bracket 260 by a rivet 70. The rivet 70 extends through the aperture or hole 270 in the plate 266, and also through a mating hole in the cover 52 to securely fasten the cover 52 to the top plate 266 and accordingly to the bracket 260 and the cross member 200. In a similar way, a rivet 70 (not shown in FIG. 4, but see FIG. 11) extends through the apertures 258 in the slave end brackets 250 to secure the cover 52 to the cross members 190 at the end brackets 250. This is best illustrated in FIG. 11.

Thus, in accordance with the embodiment of the present invention, the tonneau cover 52 is secured in two places to each cross member by being secured to the outer ends of the top plates of the brackets secured to the outer ends cross members. This applies to both the cross members 190 and the end cross member 200. That is, the cover 52 is secured to the master end slave brackets on the ends of the cross members. However, as will be discussed below in conjunction with FIG. 10, the cover 52 is also secured by rivets to the end cross member 200.

While there is a rigid connection between each cross member and its two end brackets, there is not a rigid connection between the bearing guides 120 and the end brackets of the cross members, as discussed above. The flexibility of the cover 50 allows for the relative movement, vertical and/or lateral, between the cross members in which the movement of the cross members is not parallel to the adjacent cross members.

Figure 6:
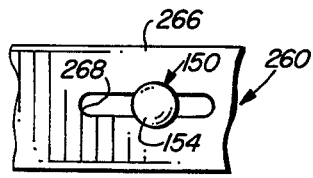
FIG. 6 is a view of a portion of the apparatus of FIG. 5, taken generally along line 6—6 of FIG. 5.

FIG. 6 is a top view of a portion of the apparatus of FIG. 5 taken generally along line 6—6 of FIG. 5. It comprises a top view of a portion of the master end bracket 260. Part of the horizontal top plate 266 of the bracket 260 is shown, and the head 154 of the screw 150 is shown on top of the slot 268. As has been discussed above, the head 154 is substantially greater in diameter than the width of the slot 268, and accordingly the screw 150 is retained within the slot 268. The provision of the slot and the screw allows for both vertical and horizontal (or lateral) relative movement between the bracket 260 and the cross member 200 to which it is secured, with respect to the screw 150 and the bearing guide 120 to which it is secured and the track 80 in which the bearing guide is disposed.

While the bracket 260 has been discussed above in conjunction with FIG. 6, it is obvious that the discussion concerning FIG. 6 is applicable to the brackets 250 with respect to the screws 150 and the bearing guides 120. The functioning of the bearing guides relative to both the master bracket 260 and the slave brackets 250 is substantially identical, since the slots on the horizontally extending top plates of the slave brackets 250 and the master bracket 260 are substantially identical. Accordingly, the relative movement between the bearing guides 120 and the track in which they are disposed with respect to the cross members 190 and 200 is substantially identical.

Figure 7:
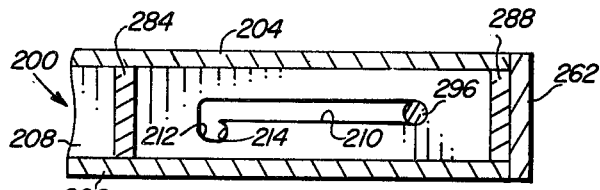
FIG. 7 is a view of a portion of the apparatus of FIG. 5 taken generally along line 7—7 of FIG. 5.

FIG. 7 is a view in partial section of a portion of the apparatus of FIG. 5, taken generally along line 7—7 of FIG. 5. For the following discussion pertaining to the locking of the cross member 200 with respect to the track 80, reference will be made primarily to FIGS. 5 and 7, but also to FIG. 12, a brief description of which has been previously given above.

The end cross member 200 is locked relative to the track 80 by a spring biased locking bolt 292 which is disposed within a bracket 280, which is in turn disposed and secured within the cross member 200. The bracket 280 comprises a generally elongated and inverted U-shaped member having a horizontally extending portion 282 and a pair of vertically extending end plates 284 and 288. As illustrated in FIG. 5, the horizontally extending portion 282 of the bracket 280 is disposed against the top wall or panel 202 of the cross member 200. The end plates 284 and 288 extend downwardly from the horizontal plate 282. End plate 284 may be considered as the inner end plate, and end plate 288 may be considered as the outer end plate. The outer end plate 288 is secured to the vertical end plate 262 of the master bracket 260, preferably as by spot welding. Thus, for assembly purposes, the bracket 280 is first secured to the bracket 260, and then the combined brackets 260 and 280 are secured to the end of the cross member 200.

The end plates 284 and 288 each have an aperture extending through the plates to accommodate the locking bolt 292. The plate 284 includes an aperture 286, and the end plate 288 includes an aperture 290. The apertures 286 and 290 are in axial alignment, and are preferably centrally disposed, vertically.

The bolt 292 moves axially with respect to the bracket 280 and the cross member 200 under the bias of a compression spring 298 which is disposed about the locking bolt 292 between the inner surface of the inner end panel 284 and a pin 296 which extends downwardly through a slot 210 in the bottom wall or panel 208 of the cross member 200. The pin 296 is preferably threaded and accordingly is received in a tapped, radially extending bore in the locking bolt 292. The compression spring 298 urges the locking bolt 292 through the aligned apertures 290 and 264, and through the aperture 172 in the side wall 168 of the outer end bracket 160, as shown in FIG. 5. The outer end of the locking bolt 292, denoted by reference numeral 294, extends through the aperture 172 to securely lock the cross member 200 to the end bracket 160 and accordingly to the track 80 to which the end bracket 160 is secured by the plurality of rivets 174, as discussed above, and as shown in FIG. 5.

Referring primarily to FIG. 7, the slot 210 which extends through the bottom panel 208 of the cross member 200 includes a locking portion or detent 212, which is simply an offset portion of the slot 210. When the pin 296 is disposed in the locking detent or slot 212, the outer or head end 294 of the locking bolt 292 is withdrawn from the locking hole 172 of the end bracket 160, and accordingly the cross member 200 is free to move longitudinally with respect to the bed of the truck 2. The inherent bias of the spring 298 against the pin 296 of the locking bolt 292 causes the pin to remain in the detent 212. As may be seen from the curved portion 214 of the detent or slot 212, which is a concavely curved portion, the pin 296 must be either moved axially inwardly, toward the inner end plate 284 of the bracket 280, or else it must be pivotally moved forwardly, or toward the cab of the truck, in order to move the pin 296 out of the locking slot 212. If the pin is first moved longitudinally inwardly, it must then be moved pivotally out of the locking slot 212 into the main portion of the slot 210 in order to allow outward axial movement of the pin 296, to the locking position, as shown in FIGS. 5 and 7.

If a pivoting movement only is given to the pin 296, then the curved portion 214 of the locking slot 212 acts as a cam to allow a slight axial movement of the bolt 292 in combination with the rotating or pivoting movement to allow the pin 296 to move into the main or axial portion of the slot 210 for movement of the bolt to its locking position, as shown in FIGS. 5 and 12.

Attention will be drawn to the description of the outer or tailgate end bracket 160, and the forward end bracket 180, given in detail above. It was noted that each end bracket includes an angled portion which extends from the respective side walls 168 and 184 of the end brackets to the side wall 88 of the track 80. Thus, when the pin 296 is released from the locking slot 212, and is allowed to move axially in the slot 210, under the bias of the spring 298, the head end 294 of the locking bolt 292 bears against the side walls, and their angled portions, of the respective end brackets, and against the side wall 88 of the track 80 while the cross member 200 is being moved relative to the bed and side walls of the pickup truck 2 to which the tonneau cover apparatus is secured. When the head end 294 of the locking bolt 292 contacts an angled portion of an end bracket, the angled portion acts as a cam surface to cause the bolt 292 to move inwardly with respect to the bracket 280 and accordingly against the bias of the spring 298 until the locking bolt 292 is coaxially aligned with either locking hole 172 of the outer or tailgate end bracket 160 or its corresponding locking hole in the end bracket 180. At such time as the locking bolt 292 is aligned with a locking hole, the bias of the spring 298 will cause the head end 294 to extend into the locking hole, to lock or secure the cross member 200 to an end bracket. Such engagement is, as discussed above, shown in FIG. 5 and is also, as previously discussed, shown in FIG. 12. Obviously, the pin 296 and the locking bolt 292 may be kept in the retracted position, with the pin 296 in the locking slot 212 until axial alignment of the head 294 with its appropriate locking hole in an end bracket is accomplished. At such time as the axial alignment is accomplished, the pin 296 may be released from the locking slot 212 to allow the locking bolt 292 to extend into a locking hole on an end bracket.

It will be noted, particularly with reference to FIG. 5, that the length of the locking bolt 292 is substantially greater than the overall length of the locking bracket 280. Moreover, the length of the slot 210 in the bottom panel 208 of the cross member 200 is correlated with the length of the locking bolt 292 to prevent the locking bolt 292 from being withdrawn out of the bracket 280. Accordingly, a portion of the bolt 292 is always disposed in the respective apertures 286 and 290.

Since there is no longitudinal or axial force on the locking bolt 292 which acts against the force of the compression spring 298, the compression spring 298 does not need to be particularly strong. It is simply of sufficient compressive strength to provide a bias to hold the head 294 of the locking bolt 292 in the locking hole or aperture 172 of the end bracket 160, or in the locking hole or aperture of the bracket 260 (see FIG. 12), to prevent the bolt from being withdrawn from the locking apertures under what may be referred to as "normal" vibrations of the pickup truck while the truck is in motion. The spring 298 is not of such strength that a substantial amount of axial force must be applied to the bolt 292 through the pin 296 when it is desired to unlock the cross member 200 for movement of the tonneau cover apparatus 50. In actual practice, only a few pounts of force is required to overcome the bias of the spring 298.

FIG. 17 comprises a perspective view of a tubular cross member 190 and a bracket 250. It will be noted that the cross member 190 is secured, as by welding, to the vertically downwardly extending plate 252 of the bracket 250. The cross member 190 is made of square tubing, and the four separate panels or walls of the tubing are clearly shown.

The square tubing 190 is secured to the plate 252 of the bracket 250, with the tubing approximately centrally located with respect to the width of the plate 252. It will be noted, as clearly shown also in FIGS. 4 and 11, that the height (vertically) of the plate 252 is about the same as the overall height of the cross member 190, but that the width of the plate 250 is somewhat greater than the width of the cross member 190. Accordingly, the cross member 190 is preferably centrally disposed, width-wise, on the plate 252.

The width of the top, horizontally extending plate 254 of the bracket 250 is substantially the same as the width of the vertically extending plate 252. In actuality, a single plate of metal (steel) may simply be bent to form the two plates of the bracket. The slot 256 and the hole 258 are centrally located, width-wise, with respect to the plate 254. They are accordingly also centrally located with respect to the cross member 190. This allows an axial alignment for both the screw 150 (see FIG. 4) and the rivet 70 (see FIG. 11) with respect to the cross member 190.

FIG. 18 comprises an exploded perspective view of the end or master cross member 200, the locking bracket 280, and the master bracket 260. From FIG. 18 it may be seen that the locking bracket 280 comprises an inverted, elongated U-shaped element which includes a center horizontally extending member 282 and a pair of downwardly depending arms or legs 284 and 288. A pair of apertures 286 and 290 extend through the arms or legs 284 and 288, respectively, and the apertures are aligned with each other. The apertures are preferably centrally located, with respect to the width of the bracket 280.

The bracket 260 includes a downwardly depending plate or arm 262 secured to a horizontally extending plate or arm 266. Like the bracket 250, the bracket 260 may simply comprise a single plate bent to form two perpendicular plates or arms 262 and 266. The plate 262 includes an aperture or hole 264 drilled through the plate and located offset from the center of the plate, width-wise. The hole 264 is drilled so as to be in alignment with the holes 286 and 290. The bracket 280 and the bracket 260 are preferably secured together, as by welding, with the holes 264 and 290 aligned with and adjacent each other, as best shown in FIG. 5. The combined brackets 260 and 280 are then secured to the cross member 200, also as by welding, by the insertion of the bracket 280 into the rectangular tubing 200. The width of the plate 262 may be slightly greater than the width of the plates 284, 282, and 288 of the bracket 280, to allow the plate 282 to substantially cover the open end of the cross member 200. Thus, when the brackets are secured to the cross member 200, the outer periphery of the cross member 200 may be appropriately welded to the plate 262 at the outer edges of the plate 262.

The locking bolt 292 is assembled into the bracket 280 before the brackets 260 and 280 are assembled to the cross member 200. The compression spring 298 (see FIG. 5) is assembled to the bracket 280. The locking bolt 292 is axially longer than the bracket 280, so that it extends through the apertures 286 and 290 at all times, as discussed above. After the brackets 260 and 280 have been secured to the cross member 200, the pin 296 is inserted through the slot 210 and secured to the bolt 292. As discussed above, the pin 296 includes threads which extend radially into a tapped aperture in the locking bolt 292.

It will be noted, from reference to both FIGS. 10 and 18, that the width of the bracket 280 is only about two-thirds of the width of the rectangular tubing of the cross member 200. The apertures 286 and 290 are centrally located with respect to the end plates 284 and 288, and accordingly the aperture 264 in the plate 262 of the bracket 260 is offset slightly from the center of the bracket 260. This is shown clearly in the exploded view comprising FIG. 18.

As shown in FIG. 10, the bracket 280 is not centrally located within the cross member 200. Rather, the bracket 280 is assembled toward the side wall or panel 204, and thus slightly remote or spaced apart from the side panel or wall 206 of the cross member 200. The off-center location of the bracket 280 allows sufficient room adjacent the panel 206 of the cross member 200 for the heads of the rivets, such as the rivet 72, without interfering with the bracket 280.

Since the downwardly depending plate 262 of the bracket 260 extends across the entire end of the cross member 200, the location of the bracket 280, with respect to the cross member 200, is substantially the same as with respect to the bracket 260. Accordingly, the bracket 280 is secured to the bracket 260 in an offset manner, not symmetrical as with respect to the cross member 190 and its bracket 250. As indicated above, the apertures 290 and 264 are aligned when the bracket 280 is secured to the bracket 260, and the aperture 264 is accordingly off-centered with respect to the plate 262 of the bracket 260. The latter point may also be understood by referring to FIG. 10, as well as to FIG. 18.

FIG. 9 comprises a view in partial section through front wall 22 of the pickup 4, adjacent the cab 4 (see FIG. 1), illustrating the securing of the tonneau cover 52 to the front end wall 22. The front wall 22 includes a top portion 23, to which is secured an awning railing 110, as by screws 100. The awning railing 100 includes a flange 112, through which the screw 100 extends, and an eye portion 114, which is generally circular in configuration. The eye 114 is opened by a longitudinally extending slot 116. The eye 114 is generally circular, and it receives an end loop 62 of the outer layer 54 of vinyl of the cover 52. Within the loop 62 is a length of the rope 74. The combined width of the rope 74 and the loop 62 is substantially greater than the width of the slot 116, and accordingly the cover 52 will not pull out of the awning railing 110. The interior diameter of the eye 114 is substantially the same as the combined diameter of the concentric rope 74 and the loop 62, and accordingly the cover 52 is retained against the front end wall 22 rather securely.

A portion of the outer vinyl layer 54 is disposed on the bottom side of the foam layer 58. This provides the same type of sandwich construction for the cover 52 as generally illustrated in FIG. 16, and as will be discussed below. A plurality of stitches 64 secures the doubled layer of vinyl 54 against the foam layer 58, with a single layer of the vinyl 54 being disposed on the top, and a single layer of the vinly 54 being disposed on the bottom, of the foam 58. The loop 62, with the rope 74, is adjacent the end of the foam 58 and adjacent the stitching or stitches 64.

As will be understood, the loop 62, with the rope therein, must be inserted lengthwise into the eye 114 and through the slot 116 of the awning railing 110. The tonneau cover 52 is accordingly secured to the front end wall 22 of the pickup truck 4, securely by means of the awning railing 110. As will be understood from reference to FIGS. 1, 9, and 16, the rope 74 extends along three sides of the tonneau cover 52, including the front side and the adjacent longitudinal or lengthwise sides, as shownin FIG. 5. However, as will be noted by reference to FIG. 10, the rope terminates at the outer or distal ends of the sides adjacent the tailgate, and does not extend laterally across the end of the pickup, parallel to and adjacent the tailgate.

FIG. 10 comprises a view in partial section through the end cross member 200, showing the tonneau cover 52 secured thereto. The cross member 200 and tonneau cover 52 are shown disposed adjacent an inner end wall 28 of the tailgate 24. Discussion concerning the bracket 280, secured to the end plate 262 of the bracket 260, which is in turn secured to the end of the tubular cross member 200, has been discussed in detail above, in conjunction with FIGS. 5 and 18. For purposes of the present discussion, the relationships between the cover 52, the cross member 200, and the tailgate 24 are significant.

A bumper of molding strip 300 is shown secured to the wall or panel 206 of the cross member 200. A portion of the outer layer 54 of the cover 52 is shown disposed between the bumper or molding 300 and the cross member 200. The portion of the layer 54 between the cross member 200 and the molding 300 is designated by reference numeral 66 in FIG. 10, and will be referred to hereafter as end 66. It will be noted that the end 66 is not a loop as is the situation when the rope 74 is within a loop. (See FIGS. 5 and 9.)

The bumper or molding strip (bumper molding) 300 includes a frame or bracket 322 to which is secured a strip of flexible molding 324. The flexible strip 324, when not disposed against the inner panel 28 of the tailgate 30, is preferably of a generally vee shape configuration, with the point of the vee extending outwardly, away from the bracket 322. In other words, the bracket 322 comprises the base of an isosceles triangle, with the molding 324 comprising the two legs or arms of the triangle. The molding comprises a cushion, for vibration, etc., between the cross member 200 and the tailgate 24.

The bumper molding 300 is secured to the cross member 200 by a plurality of rivets 72. The same rivets 72 used to secure the bumper molding 300 to the cross member 200 are also used to secure the cover 52 to the cross member 200. The rivet 72 is shown in FIG. 10 as extending through the frame or bracket 322, through the end 66 of the outer layer 54 of the cover 52, and through the panel 206 of the cross member 200.

It will be noted that the foam layer 58 extends substantially to the end of the cross member 200, and accordingly terminates adjacent the bumper molding 300. The outer layer 54 of the cover 52, disposed on the top side of the foam layer 58, and adjacent the end 66, may include, in addition to adhesive, a plurality of stitches 68 to help secure the foam and the outer layer together. The stitches 68 are adjacent the end of the foam 58.

Returning once again to FIGS. 11 and 12, the cover 52 is shown in its folded, forward position, disposed adjacent the cab 4 of the truck 2. It will be noted that the cover 52 is folded with a plurality of folds 53 extending vertically with respect to the cross members 190 and the cross member 200. When the head 294 of the locking pin 292 is retracted or withdrawn from the locking hole 172 of the outer end bracket 160 (see FIG. 5), the cross member 200, which is secured to the cover 52, as shown in FIG. 10, may be moved or pushed forwardly, towards the cab 4 of the pickup 2. The forward movement of the cross member 200 results in a corresponding forward movement of the cross members 190, which are also secured to the cover 52 at the brackets 250, to move the entire tonneau cover 52 forwardly.

As the cross members are moved forwardly, the cover 52 folds on itself into a plurality of vertical folds 53, with one fold between each cross member, as shown in FIGS. 11 and 12. As the cross members move close together, the vertical height of the folds 53 increases to a maximum height, in which the cross members 190 and the cross member 200 are disposed as close to each other as is practical, with the respective brackets, including the slave brackets 250 secured to the cross members 190, and the master bracket 260 secured to the cross member 200, disposed in relatively close relationship with respect to each other.

As has been discussed above, and as is shown in FIG. 17, the slave brackets 250 are wider than the cross members 190 to which they are secured, and accordingly there is a minimum space or distance between the cross members 190, limited or determined by the width of the slave brackets 250, and also limited, to a certain extent, by the flexibility of the cover 52. If the cover 52 is relatively thin, and accordingly relatively pliable, then the end plates 252 of the brackets 250 may be disposed virtually against each other. However, if the tonneau cover 52 is less flexible, the loops 53 may not be quite as shown in FIG. 11, but rather there may be a spacing between the brackets 250 to which the cover 52 is secured.

Preferably, the cover 52 is of sufficient rigidity to provide some resistance to the movement of the cross members 190. This resistance causes the folds 53 to extend vertically upwardly, as shown. If the cover 52 is relatively flexible, the folds may tend to extend both vertically upwardly and downwardly. The vertically upwardly folding in such case usually takes place at the sides of the cover apparatus, adjacent the brackets, and the downward folding generally takes place toward the center portion of the cover. The vertically downward folding results in frictional drag between the cross members and their bearing guides in thetracks, and results in resistance to the movement of the cross members and the tonneau cover. The vertically upward folding of the cover apparatus, as shown in FIGS. 12 and 13, substantially decreases the frictional resistance of the cross members, as compared with the downward folding, and the bearing guides 120 as disposed on the track 80. Thus, the vertically upwardly extending folds 53 allow the cover 52 to be folded with a relatively small amount of opposing frictional drag or resistance between the track 80 and the bearing guides, brackets, and cross members.

With the cover 52 folded as shown in FIGS. 11 and 12, the head 294 of the locking bolt 292 extends into a locking hole in the side wall 184 of the inner or forward end bracket 180, as best shown in FIG. 12. The inner or forward end bracket comprises a lock bracket for locking the outer cross member 200, and the cover 52, adjacent the cab 4, and remote from the tailgate 24. The cover 52, and its cross members, are accordingly locked in place in the forward position. As discussed above, the locking bolt 292 is provided a bias by compression spring 298 to keep the locking bolt 292 in the locking holes on the outer or rear locking end brackets and the inner or forward end locking brackets secured to the rails 80. Movement of the locking bolt 292 against the bias of the spring 298 allows the head(s) 294 of the locking bolt(s) 292 to be removed from a(the) locking hole(s). With the head(s) 294 out of the locking hole(s), the cross member 200, and the cross members 190, which are all secured together and to the cross member 200 by virtue of the cover 52, are allowed to move.

The slot 256 of the bracket 250, secured to the cross member 190, and also the slot 268 of the bracket 260, secured to the cross member 200, allows both vertical and lateral movement of the cross members relative to the bearing guides 120 which are disposed in the track 80, as discussed above. The movement of the cross members with respect to their bearing guides may be either vertical or lateral, or a combination of both, as discussed above. This allows compensation for movement, height, or the like. Moreover, the relationship between the cross members and the bearing guides provided by the slots, allows longitudinal movement of the bearing guides in the track(s), without regard to the actual position or location at which force is applied to the cross members, since the force imparted from the cross members against the bearing guides will be in an axial or longitudinal direction from the sides of the slots 256 or 268 to the screw or rivet extending through the slots and secured to the bearing guides which are in turn disposed in the track 80. Thus, the ultimate movement of the bearing guides is longitudinal or axial in the track, with a minimum of side force or lateral forces applied to the bearing guides from the cross members. Binding of the cross members and their bearing guides is accordingly minimized by the apparatus of the present invention.

FIG. 16 comprises a view in partial section of the tonneau cover 52, and it is representative, generally, of the construction of the tonneau cover 52. With respect to the location of the rope 74, it is also representative of the sides of the tonneau cover 52, adjacent the brackets 250 and 260, where the tonneau cover 52 is secured to the horizontally extending plates 254 and 266 of the brackets 250 and 260, respectively, (see FIGS. 4, 5, 17 and 18), and along the sides 6 and 14 of the truck 2 (see FIG. 1).

The tonneau cover 52 includes a top or outer layer 54, which is preferably vinyl, and which is a relatively thin layer, secured to a foam layer 58. The bonding between the top or vinyl 54 and the foam layer 58 may be by a combination of adhesive (not shown) and stitching, which is well known and understood.

Disposed beneath the outer edge of the foam layer 58, and also perhaps bonded by adhesive thereto, is the rope 74. The rope 74 extends longitudinally (lengthwise) with respect to the cover 52, and it may be bonded to the foam layer 58 with adhesive, if desired. A loop 56 of the top or vinyl layer 54 is disposed about the outer end of the foam layer 58, downwardly, and around the rope 74. The layer 54 is then disposed against the bottom or underneath side of the foam 58, extending inwardly a short distance, away from the rope 74. Stitching 66 extends through both layers of the vinyl top 54 and the foam to secure the layer 54 to the foam 58. In addition to the stitching 66, the bottom layer 54 may also be bonded to the underneath side of the foam 58. In such case, the stitching 66 serves as a precautionary measure to doubly insure that the rope 74 and the loop 56 remain in place.

Referring again briefly to FIGS. 4 and 5, the outer ends of the brackets 250 and 260 extend about even with the outer end of the horizontal flange 94 of the track 80. As best shown in FIG. 5, the cover 52 is secured to the brackets 260 (and 250), with the outer side of the cover 52, which includes a loop 56 and a rope 74, disposed outwardly of the outer ends of the brackets, and outwardly of the outer end of the horizontal flange 94. Thus, the loop 56, with the rope 74 disposed therein, serves to help provide a smoothly, unbroken side for the tonneau cover apparatus 50 such that when the cover 52 is in the closed position, as shown in FIG. 1, the track and bracket hardware are not seen. Moreover, the loop 56 also serves to help seal the tonneau cover apparatus 50 with respect to the top walls of the sides of the pickup, such as the right side wall 20 shown in FIGS. 4 and 5.

What is claimed is:

1. In a pickup truck having a cab, a bed extending rearwardly from the cab, two sides extending upwardly from the bed, and a tailgate remote from the cab, tonneau cover apparatus extending between the sides and from the cab to the tailgate, for covering the bed, comprising, in combination:

track means secured to the sides of the pickup truck;

bearing means disposed in the track means and movable therein;

bracket means secured to the bearing means and movable therewith in the track means, and including plate means, a slot extending through the plate means, fastening means extending through the slot and secured to the bearing means for securing the bracket means to the bearing means for moving the bracket means and the bearing means in the track means and movable in the slot for providing axial, lateral, and vertical movement of the plate means of the bracket means relative to the bearing means; and cover means secured to the plate means and movable with the bracket means and the bearing means for selectively covering and uncovering the bed of the pickup truck.

2. The apparatus of claim 1 in which the bracket means includes cross member means extending across the pickup truck bed and beneath the cover means for supporting the cover means.

3. The apparatus of claim 2 in which the track means includes a first track and a second track secured respectively to one side and to the other side of the pickup truck and oriented in substantially parallel alignment with each other, and the bearing means includes first bearing means and second bearing means, and the bracket means includes first bracket means and second bracket means secured respectively to the first bearing means and to the second bearing means, and the first bearing means and first bracket means are movably disposed in the first track and the second bearing means and the second bracket means are movably disposed in the second track, and the cross member means includes a cross member secured to the extending between the first and the second bracket means.

4. The apparatus of claim 3 in which the track means includes outer end bracket means secured to the track means for providing a stop to retain the bearing means within the track means.

5. The apparatus of claim 4 in which the bearing means further includes a plurality of first bearing means and a plurality of second bearing means movable in the first track means and in the second track means respectively, and a plurality of cross member means extending therebetween, and each first and second bearing means of the plurality of bearing means includes a bracket and a plate secured thereto and a cross member secured between the brackets of each first and each second bearing means.

6. The apparatus of claim 5 in which the plurality of first and second bearing means and cross member means comprises a predetermined number of pairs of first and second bearing means, with each pair including a first bearing means and a second bearing means, a bracekt movably secured to each bearing means, and a cross member secured to each bracket.

7. The apparatus of claim 6 in which one of the cross members of the cross member means comprises an outer cross member disposed remotely from the cab of the pickup and remotely from each of the other cross members and extending between a pair of first and second bearing means.

8. The apparatus of claim 7 in which the outer cross member includes locking means for locking the outer cross member to the outer end bracket means secured to the track means.

9. The apparatus of claim 8 in which the outer end bracket means includes a first outer end bracket and a second outer end bracket secured respectively to the first and second tracks of the track means remote from the cab and adjacent the tailgate, and each of the first and second outer end brackets includes an aperture extending therethrough for receiving the locking means of the outer cross member.

10. The apparatus of claim 9 in which the locking means includes a first locking means and a second locking means for the first and second outer end brackets, respectively.

11. The apparatus of claim 10 in which the first and second locking means secured to the outer cross member includes a first locking bolt and a second locking bolt movable respectively into the apertures in the first and second outer end brackets for securing the outer cross member to the first and second track means.

12. The apparatus of claim 11 in which the cover means is secured to the outer cross member along substantially the entire length of the outer cross member, and is movable therewith.

13. The apparatus of claim 12 in which the track means further includes inner lock bracket means for locking the outer cross member adjacent the cab and remote from the tailgate.

14. The apparatus of claim 13 in which the inner lock bracket means includes a first and a second inner lock bracket secured respectively to the first and the second tracks of the track means and each inner lock bracket includes an aperture for respectively receiving the first and second locking bolts to lock the outer cross member to the track means.

* * * * *